United States Patent

[11] 3,592,500

[72] Inventor Paul C. Setzler
Jericho Road, Sherman, Conn. 06784
[21] Appl. No. 829,371
[22] Filed June 2, 1969
[45] Patented July 13, 1971

[54] REMOVABLE HANDLE FOR PORTABLE CONTAINERS
5 Claims, 7 Drawing Figs.
[52] U.S. Cl. ................................................. 294/27, 224/45
[51] Int. Cl. ................................................. A47j 45/00
[50] Field of Search ......................................... 220/85 H, 90.4, 94; 294/27, 30, 34

[56] References Cited
UNITED STATES PATENTS
1,998,771  9/1931  Smith ........................... 294/27
2,888,179  4/1957  Daggert ....................... 220/85 (H)
3,185,515  1/1963  Marler ......................... 220/85 (H) X Primary Examiner—Evon C. Blunk
Assistant Examiner—Johnny D. Cherry
Attorney—Robert H. Ware ABSTRACT: A removable and reusable handle to be secured on milk cartons and similar portable containers for convenient lifting of filled cartons and also for dispensing contents therefrom. The handle may be removed and reused with many successive cartons.

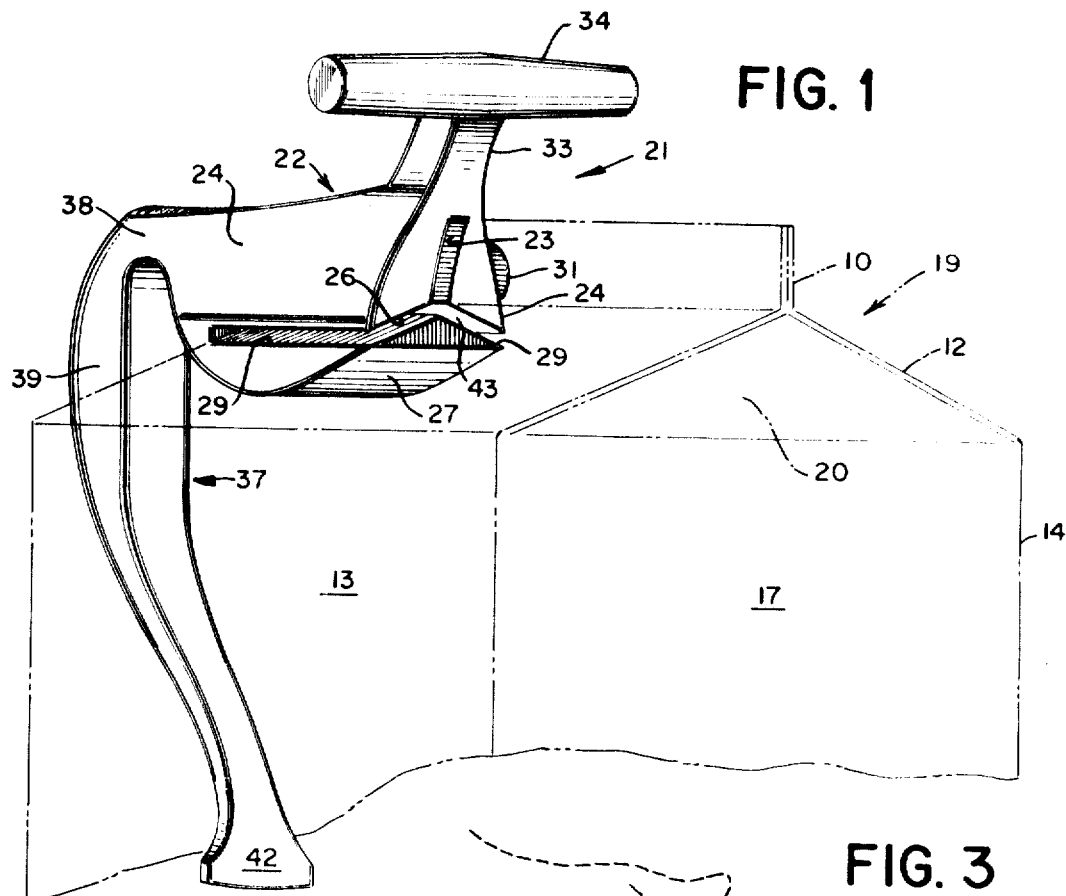
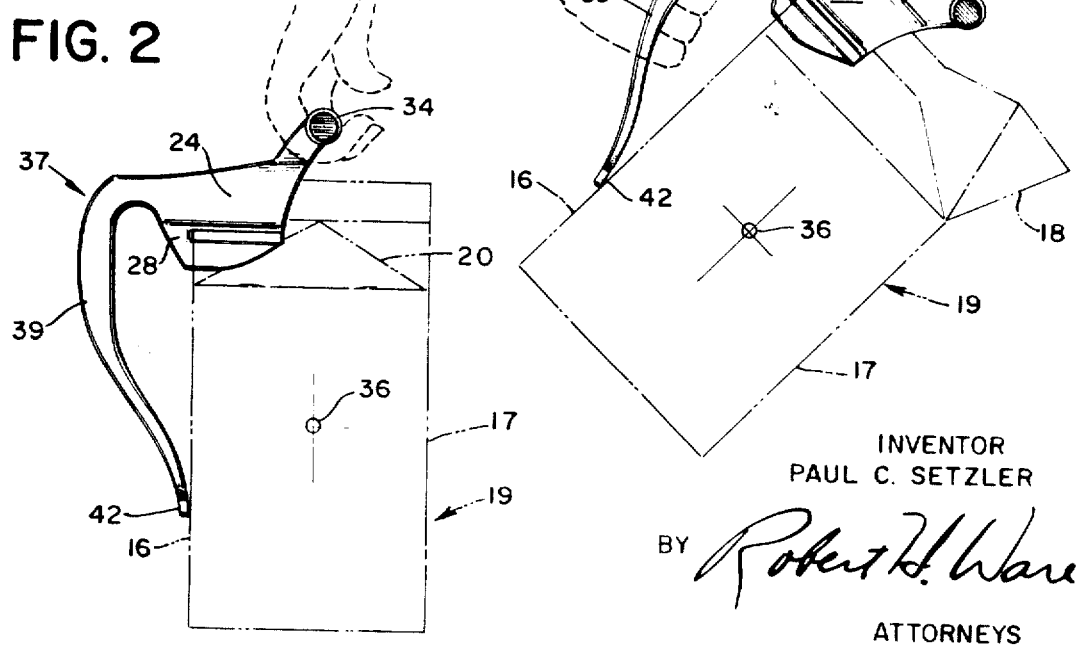

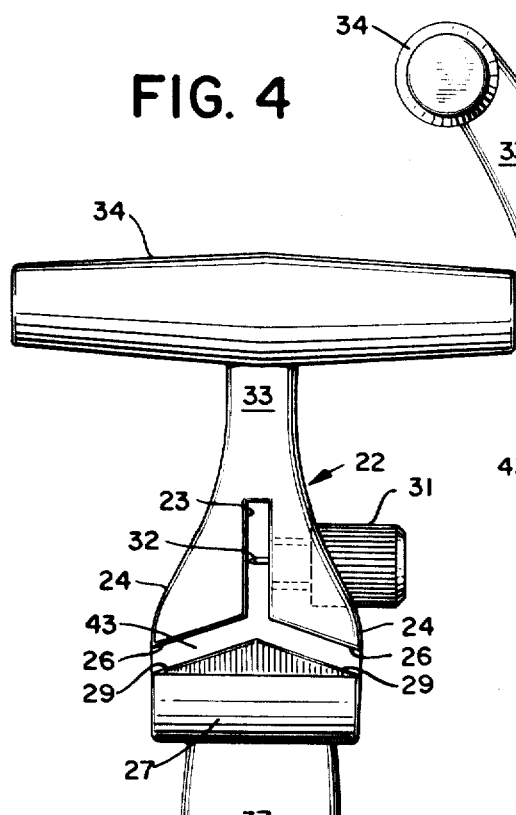
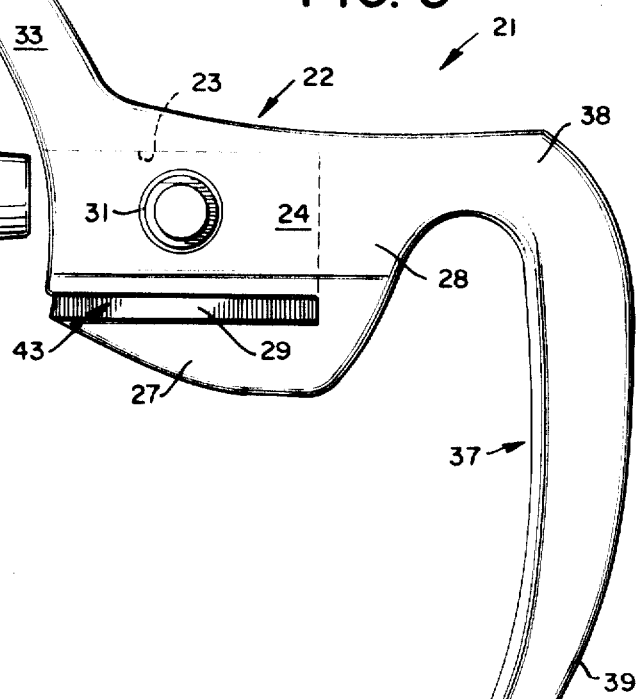
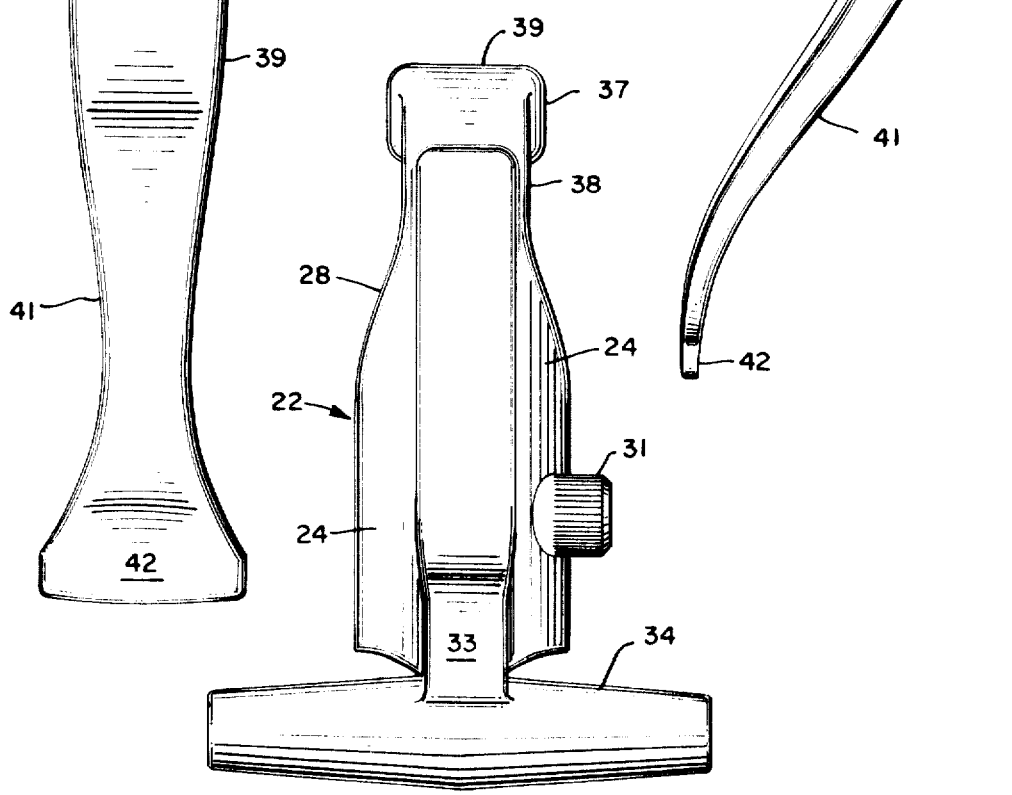

3,592,500

REMOVABLE HANDLE FOR PORTABLE CONTAINERS

The invention relates to removable handles configured and dimensioned to be mounted on milk cartons, particularly one gallon plastic-coated paperboard milk cartons, thus providing a carrying handle for transporting these cartons and also providing pouring support for the cartons when contents are being dispensed therefrom.

BACKGROUND OF THE INVENTION

In order to avoid the many disadvantages of glass milk bottles including breakage, injuries, heavy weight and the inconvenience of repeated washing and sterilization before reuse, disposable milk containers of various kinds have been introduced over the years. Several popular forms of disposable milk containers are formed of plastic-coated paperboard material, and are generally marked "made under license from Ex-Cell-O Corporation by International Paper, Single Service Division, New York, New York." These cartons carry one or more of the following patent numbers: U.S. Pat. Nos. 3,116,002; 3,120,333; 3,120,335; Reissue 26,305.

These plastic-coated or plastic-impregnated rectangular milk cartons eliminate many disadvantages of glass bottles and are also superior to wax-coated paperboard milk cartons previously in use. However, they possess the disadvantage of awkward, heavy weight and they are difficult for many persons to carry. The weight of a full gallon container of milk is approximately 10 pounds, and the mating uppermost seams of these cartons occasionally separate inadvertently during carrying, destroying the most convenient "grip" for carrying the full container. The consumer is therefore forced to use both hands and to place them firmly beneath the bottom of the full gallon milk container in order to avoid spilling.

Additional problems are presented by manipulation of these full ten pound milk cartons during pouring. Many users find sensitive manual tilting control of these heavy and bulky cartons to be difficult, and internal sloshing of milk therein produces frequent spills, distressing many users.

Accordingly there has developed an important unfilled need for a carrying-pouring aid to be utilized with these full gallon milk cartons and similar containers. For maximum usefulness, this carrying-pouring aid must be light in weight and conveniently reusable with a succession of new containers. It should provide a convenient carrying handle safely securable to the portable container in its delivered condition, both before and after opening, and it must avoid any danger of inadvertent separation of the topmost seam and consequent rupture of the container and spilling of its contents. It must also provide a pouring handle conveniently usable for tilting manipulation of the heavy full container in order to pour the contents gently and smoothly therefrom in an easily controlled stream.

SUMMARY OF THE INVENTION

The carrying-pouring handle for the present invention fulfills all of the foregoing objectives with great economy of material and attractive elegance of design. The present invention involves carrying handles, carrying-pouring handles, removable lifting handles, and portable milk container handles.

The handles of the present invention comprise a carton engaging grip section firmly and securely enclosing a substantial portion of the delivered carton, preventing its inadvertent deformation during use while firmly securing the detachable and reusable handle thereon. The uppermost portion of these devices affords a highly convenient and useful container-carrying handle positioned above the center of gravity of the container. A laterally protruding and downwardly extending pouring handle portion of these devices projects in laterally outwardly spaced relationship beyond the side of the container, to provide a convenient pouring handle opposite to the openable pour spout portion of the container top.

Accordingly a principal object of the present invention is to provide lightweight, convenient, removable and reusable handle devices for attachment to standard portable gallon milk cartons and similar containers. A further object of the invention is to provide dual handle means for carrying such portable containers and dispensing the contents therefrom without readjustment of the attachment device.

Other and more specific objects will be apparent from the features, elements, combinations and operating procedures disclosed in the following detailed description and shown in the drawings.

THE DRAWINGS

FIG. 1 is a perspective corner elevation view of a dual purpose removable handle incorporating the principles of the present invention and shown mounted upon a standard milk carton indicated in phantom dot-dash lines;

FIG. 2 is a right side elevation view of the same removable handle shown in its carrying position;

FIG. 3 is a right side elevation view of the same removable handle shown in its container-pouring position;

FIGS. 4, 5 and 6 are enlarged respective front, left side and top plan views of the carrying handle illustrated in FIGS. 1—3.

CONTAINER GRIP PORTION

Figure 7:
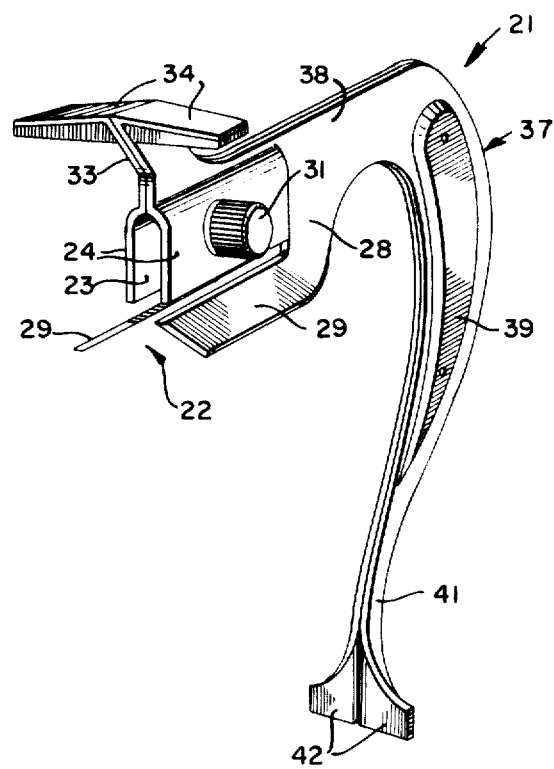
FIG. 7 is a perspective view of a different embodiment of the invention incorporating modified features.

The central grip portion 22 of the carrying handle attachment device of the present invention incorporates container gripping surfaces spaced for sliding telescoping engagement to receive and support the exposed topmost end surfaces of an erected and filled paperboard container, such as a standard Ex-Cell-O Corporation one gallon milk container. As indicated in dot-dash lines in FIGS. 1, 2 and 3, these containers are generally rectangular in horizontal cross section with their opposite upper side portions being folded inward. These upper side portions thus form a "slant roof" top portion terminating centrally in an upwardly protruding ridge flange 10 forming the central uppermost edges of two upsloping and converging roof panels 11 and 12, which themselves form the uppermost portions of opposite side walls 13 and 14 of the container. Between the opposite sidewalls 13 and 14, two similar sidewalls 16 and 17 terminate in infolded triangular panels 20 tucked under the roof panels 11 and 12 forming recessed "gable end" cavities, as shown in the views of FIGS. 1 and 2.

These paperboard cartons are generally marked to suggest to the user that they may be conveniently opened by deforming the front overhanging eave edges of the roof panels 11 and 12 in order to pull apart the mating edge portions forming the ridge flange 10, and thereby gaining access to the interior of the container. By buckling this eave edge portion of the roof panels 11 and 12 in this upfolded condition, a pour spout 18 is formed, permitting the contents of the container 19 to be dispensed by the user.

The handle attachment 21 incorporating the features of the present invention is designed for cooperative engagement with these container roof panels, and includes in the central grip portion 22 means forming a vertically elongated and horizontally extending flange slot 23 dimensioned to receive the substantial end portion of the container ridge flange 10. The slot 23 is formed between gripping sidewalls 24, flanking the ridge slot 23 and terminating in downwardly, outwardly sloping diagonal bottom faces 26 positioned to overlie the roof panels 11 and 12 of the carton 19. A shelf portion 27 of grip section 22 extends in cantilever fashion from a unitary trunk portion 28, and underlies the faces 26 of the gripping sidewalls 24. Shelf portion 27 is provided with downwardly outwardly sloping upper faces 29 opposing and spaced downwardly from the lower faces 26 of the gripping sidewalls 24. Faces 29 are configured to underlie the exposed undersides of the eave portions of roof panels 11 and 12 of the carton 19 at points adjacent to the terminal ends of the ridge flange 10 of the carton 19, as indicated in FIG. 1.

The entire central grip portion 22 of the handle attachment 21 thus forms a unitary three-part body extending forward in cantilever fashion from the trunk portion 28 for sliding telescoping engagement enclosing both sides of the end of ridge flange 10 and both the upper and lower faces of the eave portions of roof panels 11 and 12 of the carton 19 in the engaged position shown in FIG. 1.

A threaded set screw 31 is centrally mounted in one of the gripping sidewalls 24 as illustrated in FIGS. 1, 4, 5 and 6 and is provided with a traction point 32 dimensioned for embedding engagement with the ridge flange 10 of the carton 19 in engaged condition of the handle attachment 21. Traction point 32 thus secures the carton 19 against movement relative to the attachment 21 when the attachment is installed on the carton.

CARRYING HANDLE PORTION

Cantilevered diagonally upward from the forward ends of gripping sidewalls 24 is a neck portion 33 surmounted by an integral carrying handle 34 extending sidewise in each direction therefrom in a T-shaped formation to permit the fingers of the user to encircle and grip this carrying handle 34 as shown in FIG. 2. Customarily the user will place two fingers to the right and two fingers to the left of the neck 33, with all four fingers encircling the carrying handle 34, and the T-shaped formation of the neck 33, handle 34 combination is extremely useful for this purpose. It will be noted in FIG. 2 that the carrying handle 34 is positioned above the center of gravity 36 of the container 19, providing stable carrying action with a minimum risk of spilling or slopping of the contents of container 19 while it is being carried by the user.

POURING HANDLE PORTION

A pouring handle 37 extends from trunk portion 28 in a rearward direction away from the grip portion 22 and the carrying handle 34, in "flying buttress" relationship to the grip portion 22 of the attachment 21. This pouring handle 37 comprises a reduced stem portion 38 extending from the trunk portion 28 in a generally horizontal outward direction, terminating in a downturned handgrip portion 39 spaced laterally from the terminal end of the ridge slot 23. This configuration spaces the handgrip portion 39 outwardly away from the sidewall 16 of carton 19, as indicated in FIGS. 2 and 3, and thereby provides ample space for the user's fingers to encircle the handgrip portion 39 in order to utilize it as a pouring handle, as shown in FIG. 3.

The lowermost end of pouring handle portion 37 provides an incurving stabilizing base portion 41 terminating in a pad 42 positioned to bear against the carton sidewall 16, as shown in FIGS. 2 and 3, and forming a unitary, attractive-appearing assembly of attachment 21 with carton 19 while also providing additional stable supporting contact between the pad portion 42 of the base portion 41 against sidewall 16 of carton 19 for firm solid support, slightly deforming or depressing sidewall 16 to minimize quivering vibration and consequent splashing of contents during pouring. As shown in FIG. 3, the pouring handle 37 is positioned generally above the center of gravity 36 of container 19 in its tilted pouring orientation there illustrated, contributing added stability during dispensing of contents from the tilted container 19.

It will be understood that the handle attachments of the present invention can be readily secured either to gable end containers of the kind shown in FIG. 1, or instead to modified gable end containers, such as those omitting the upwardly projecting ridge flange 10 and substituting a narrow flat roof panel portion, for example. If desired, minor modifications of the embodiments illustrated in FIGS. 1 and 2 readily adapt these handle attachments to receive and support such flat top gable end containers.

CARTON SUPPORTING GROOVES

The Y-shaped groove configuration illustrated best in FIGS. 1 and 4 is formed by the conjunction of the ridge slot 23 extending upward from the convergence of the downwardly and outwardly extending roof panel grooves 43 defined between the spaced apart opposing faces 26 and 29. While both sides of the ridge slot 23 serve to position the handle attachment 21 on the ridge flange 10 of the carton 19, the lower surfaces 29 defining the roof panel grooves 43 form the supporting surfaces for the carton 19, since they underlie the eave edges of roof panels 11 and 12. The shape and position of the faces 26 of gripping sidewalls 24 is considered to be less significant than the outward and downwardly sloping, smooth, flat configuration of the upper faces 29 of shelf portion 27 underlying the roof panel grooves 43. This is clearly illustrated in the modified embodiment of FIG. 7, formed of stamped sheet metal, incorporating the principal essential features of the embodiment of FIGS. 1—6.

In the stamped sheet metal embodiment of FIG. 7, it will be noted that the container gripping portion 22 of the handle attachment 21 extends from a trunk portion 28 to form a ridge slot 23 bounded by two sidewall portions 24, one of which incorporates a setscrew 31; two downward and outwardly sloping shelf faces 29 extend in cantilever fashion outward beneath sidewalls 24 from trunk portion 28. A diagonally extending neck 33 protrudes upwardly above ridge slot 23 terminating in T-shaped carrying handles 34. In the opposite direction, a stem portion 38 extends rearwardly outward from trunk portion 28, terminating in an outward and downwardly curved handle portion 37 including a hand grip portion 39 with an incurved lower end 41 terminating in a base pad 42.

A comparison of FIG. 7 with FIG. 1 will show that each of these container-supporting and container-contacting surfaces and features is positioned in substantially the same location in each of these embodiments of the invention. In each case, the pads 42 contact the sidewall 16 of the container. Handgrip portion 39 is spaced outwardly away from sidewall 16 for convenient pouring support. Ridge groove 23 with its setscrew 31 enclose and secure the ridge flange 10 of the container, and the uppermost carrying handle 34 surmounts the entire container attachment assembly 21 at a point above the center of gravity of the attached container. The container is supported by the shelf faces 29 in each embodiment of the handle attachment 21 by engagement of the undersides of the recessed gable ends of roof panels 11 and 12 of container 19 with these shelf faces 29, as indicated in FIGS. 1 and 7.

When container 19 has been emptied, it is easily removed from the handle attachment 21 by retracting set screw 31 to disengage ridge flange 10 from traction point 32. The attachment 21 will then slide telescopingly lengthwise from the end of ridge flange 10 and roof panels 11 and 12. The empty container 19 may then be discarded and the handle attachment 21 may be installed upon a full carton 19 for immediate reuse.

Since the foregoing description and drawings are merely illustrative, the scope of the invention has been broadly stated herein and it should be liberally interpreted so as to obtain the benefit of all equivalents to which the invention is fairly entitled.

What I claim is:

1. A removable and reusable unitary carrying attachment for manually portable gable roofed containers comprising:
   A. a central trunk portion;
   B. a container-gripping portion incorporating cantilever shelf means protruding from the central trunk portion and having shelf faces positioned for underlying supporting engagement beneath the eave ends of gable roof panels at the top of a portable container;
   C. an upwardly extending carrying grip portion joined to the trunk portion and positioned above the location of the center of gravity of the container to be supported on the cantilever shelf faces; and D. a protruding pouring grip portion extending outwardly from said trunk portion in a direction opposite to the cantilever shelf means and spaced outwardly from the gable end roof panels of the carton overlying the cantilever shelf faces, terminating in an inwardly extending return portion having a terminal tip substantially aligned with the extreme inner blind ends of said cantilever shelf means at the central trunk portion in the normal vertical carrying position of the attachment when the weight of said container is thereby transmitted to said overlying carrying grip portion, providing stabilizing lateral support for the side portion of said container in said vertical carrying position.

2. The removable handle attachment defined in claim 1 further including clamping means for anchoring the gable roof container in fixed relationship with the underlying cantilever shelf faces.

3. The removable handle attachment defined in claim 1 further including means forming a ridge slot positioned to receive a ridge flange extending upward from the gable end of said container.

4. The removable handle attachment defined in claim 2 wherein the clamping means comprises a setscrew movably mounted in the handle attachment and positioned for advanceable engagement and retractable disengagement with the supported container.

5. The removable handle attachment defined in claim 4 wherein the container-gripping portion incorporates means forming a ridge slot positioned to receive a ridge flange extending upward from the gable end of said container, and wherein the setscrew is positioned to advance into the ridge slot for interfering engagement with a container ridge flange positioned therein.